United States Patent
Pula et al.

(10) Patent No.: US 11,177,973 B2
(45) Date of Patent: Nov. 16, 2021

(54) DISTRIBUTED AUDIENCE COMPUTATION SOFTWARE SERVICE

(71) Applicant: salesforce.com, inc., San Francisco, CA (US)

(72) Inventors: Vijaya Saradhi Pula, San Francisco, CA (US); Kathiravan Sengodan, San Francisco, CA (US); Ritwik Malvi, San Francisco, CA (US); Mahanthi Gangadhar, San Francisco, CA (US); Chandramohan Dhandapani, San Francisco, CA (US)

(73) Assignee: SALESFORCE.COM, INC., San Francisco, CA (US)

( * ) Notice: Subject to any disclaimer, the term of this patent is extended or adjusted under 35 U.S.C. 154(b) by 104 days.

(21) Appl. No.: 16/740,160

(22) Filed: Jan. 10, 2020

(65) Prior Publication Data

US 2021/0218586 A1 Jul. 15, 2021

(51) Int. Cl.
*H04L 12/18* (2006.01)
*H04L 12/58* (2006.01)
*G06F 16/22* (2019.01)

(52) U.S. Cl.
CPC ........ *H04L 12/185* (2013.01); *G06F 16/2255* (2019.01); *H04L 51/14* (2013.01)

(58) Field of Classification Search
CPC ... G06F 16/2255; G06F 21/35; H04L 12/185; H04L 51/14; H04L 2209/24; H04L 63/123

USPC ....................................................... 709/206
See application file for complete search history.

(56) References Cited

U.S. PATENT DOCUMENTS

| | | |
|---|---|---|
| 5,577,188 A | 11/1996 | Zhu |
| 5,608,872 A | 3/1997 | Schwartz et al. |
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |

(Continued)

*Primary Examiner* — Mahran Y Abu Roumi
(74) *Attorney, Agent, or Firm* — Schwabe Williamson & Wyatt

(57) ABSTRACT

Among other things, embodiments of the present disclosure relate to distributing the determination of target audience lists across multiple clusters of nodes. Other embodiments may be described and/or claimed.

20 Claims, 15 Drawing Sheets

(56) References Cited

U.S. PATENT DOCUMENTS

| | | |
|---|---|---|
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,205,264 B1 * | 6/2012 | Kailash .................. H04L 67/02 726/25 |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,566,301 B2 | 10/2013 | Rueben et al. |
| 8,646,103 B2 | 2/2014 | Jakobson et al. |
| 10,853,334 B2 | 12/2020 | Gangadhar et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2006/0168033 A1 * | 7/2006 | Cai .......................... H04L 51/12 709/206 |
| 2006/0288076 A1 * | 12/2006 | Cowings ................. H04L 51/28 709/206 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2011/0218958 A1 | 9/2011 | Warshavsky |
| 2011/0247051 A1 * | 10/2011 | Bulumulla .............. G06F 21/00 726/4 |
| 2012/0042218 A1 | 2/2012 | Cinarkaya |

(56) References Cited

U.S. PATENT DOCUMENTS

| | | | |
|---|---|---|---|
| 2012/0077467 A1* | 3/2012 | Fan | H04W 4/24 |
| | | | 455/414.1 |
| 2012/0233137 A1 | 9/2012 | Jakobson et al. | |
| 2012/0290407 A1 | 11/2012 | Hubbard et al. | |
| 2013/0212497 A1 | 8/2013 | Zelenko et al. | |
| 2013/0218948 A1 | 8/2013 | Jakobson | |
| 2013/0218949 A1 | 8/2013 | Jakobson | |
| 2013/0218966 A1 | 8/2013 | Jakobson | |
| 2013/0247216 A1 | 9/2013 | Cinarkaya | |
| 2014/0359537 A1 | 12/2014 | Jackobson et al. | |
| 2015/0121066 A1* | 4/2015 | Nix | H04L 9/006 |
| | | | 713/155 |
| 2015/0304736 A1* | 10/2015 | Lal | G06F 21/72 |
| | | | 380/210 |
| 2016/0308821 A1* | 10/2016 | Siba | H04L 29/12066 |
| 2017/0154051 A1* | 6/2017 | Mitchell | G06F 3/04842 |
| 2017/0278142 A1* | 9/2017 | Riordan | H04L 67/18 |
| 2019/0166216 A1* | 5/2019 | Chen | G06F 16/9535 |
| 2019/0332712 A1* | 10/2019 | Wild | G06F 16/2255 |
| 2020/0241996 A1 | 7/2020 | Dillon, Jr. et al. | |

\* cited by examiner

| orgId | userId | Unique Audience Name | Recipient(L) or Suppression(S) | Message sequence number | Batch Size | is end of stream (T/F) | Not Used | Not Used | Not Used | payload |
|---|---|---|---|---|---|---|---|---|---|---|

*FIGURE 4F*

| orgId | userId | Unique Audience Name | SegmentID (server Mod) | Recipient List Stats | Suppression List Stats | Audience Size | Message Sequence Number | Start Offset | is end of stream (T/F) | payload |
|---|---|---|---|---|---|---|---|---|---|---|

*FIGURE 4G*

DISTRIBUTED AUDIENCE COMPUTATION SOFTWARE SERVICE

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

Embodiments of the present disclosure relate to distributing the determination of target audience lists across multiple clusters of nodes. Other embodiments may be described and/or claimed.

BACKGROUND

A variety of software platforms generate and distribute electronic communications (such as emails, SMS text messages, and other communications) to groups of recipients. Some platforms, for example, may generate and send customizable emails to large numbers of recipients (which may be referred to herein as "prospects"). Such platforms may support electronic communication features such as list emails, A/B emails, and other features that depend on a process known as "segmentation," where the prospects are segmented based on certain 'mailability' criteria and one or more lists are created to hold those email addresses.

For example, a "recipient list" may hold the email lists of prospects who successfully met the criteria to receive the email, and a "suppression list" may hold the email lists of prospects, who are inactive or "opted-out" from receiving emails. Such lists may be stored in a database (e.g., a listx_prospect table) for later use at the time of email sending. So, for every "list" or "A/B" email send operation, the final email recipient list (which may also be referred to as a "target audience" list) needs to be computed dynamically by reading and processing multiple "recipient" and "suppression" lists of email addresses from the database, where each of these list can contain entries, anywhere from few hundreds to tens of millions entries. Hence the process of audience computation involves loading, creating and manipulating large "sets" of sparse and random data in-memory, which forces an upper limit on the number of list elements, bound by available memory and processing power. Embodiments of the present disclosure address these and other issues.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIGS. 4F and 4G illustrate examples of message formats that may be used in conjunction with embodiments of the present disclosure.

DETAILED DESCRIPTION

Examples of systems, apparatuses, computer-readable storage media, and methods according to the disclosed implementations are described in this section. These examples are being provided solely to add context and aid in the understanding of the disclosed implementations. It will thus be apparent to one skilled in the art that the disclosed implementations may be practiced without some or all of the specific details provided. In other instances, certain process or method operations, also referred to herein as "blocks," have not been described in detail in order to avoid unnecessarily obscuring the disclosed implementations. Other implementations and applications also are possible, and as such, the following examples should not be taken as definitive or limiting either in scope or setting.

In the following detailed description, references are made to the accompanying drawings, which form a part of the description and in which are shown, by way of illustration, specific implementations. Although these disclosed implementations are described in sufficient detail to enable one skilled in the art to practice the implementations, it is to be understood that these examples are not limiting, such that other implementations may be used and changes may be made to the disclosed implementations without departing from their spirit and scope. For example, the blocks of the methods shown and described herein are not necessarily performed in the order indicated in some other implementations. Additionally, in some other implementations, the disclosed methods may include more or fewer blocks than are described. As another example, some blocks described herein as separate blocks may be combined in some other implementations. Conversely, what may be described herein as a single block may be implemented in multiple blocks in some other implementations. Additionally, the conjunction "or" is intended herein in the inclusive sense where appropriate unless otherwise indicated; that is, the phrase "A, B or C" is intended to include the possibilities of "A," "B," "C," "A and B," "B and C," "A and C" and "A, B and C."

Some implementations described and referenced herein are directed to systems, apparatuses, computer-implemented methods, and computer-readable storage media for providing message-based authentication for users attempting to establish electronic communications with computing devices.

I. System Examples

Figure 1A:
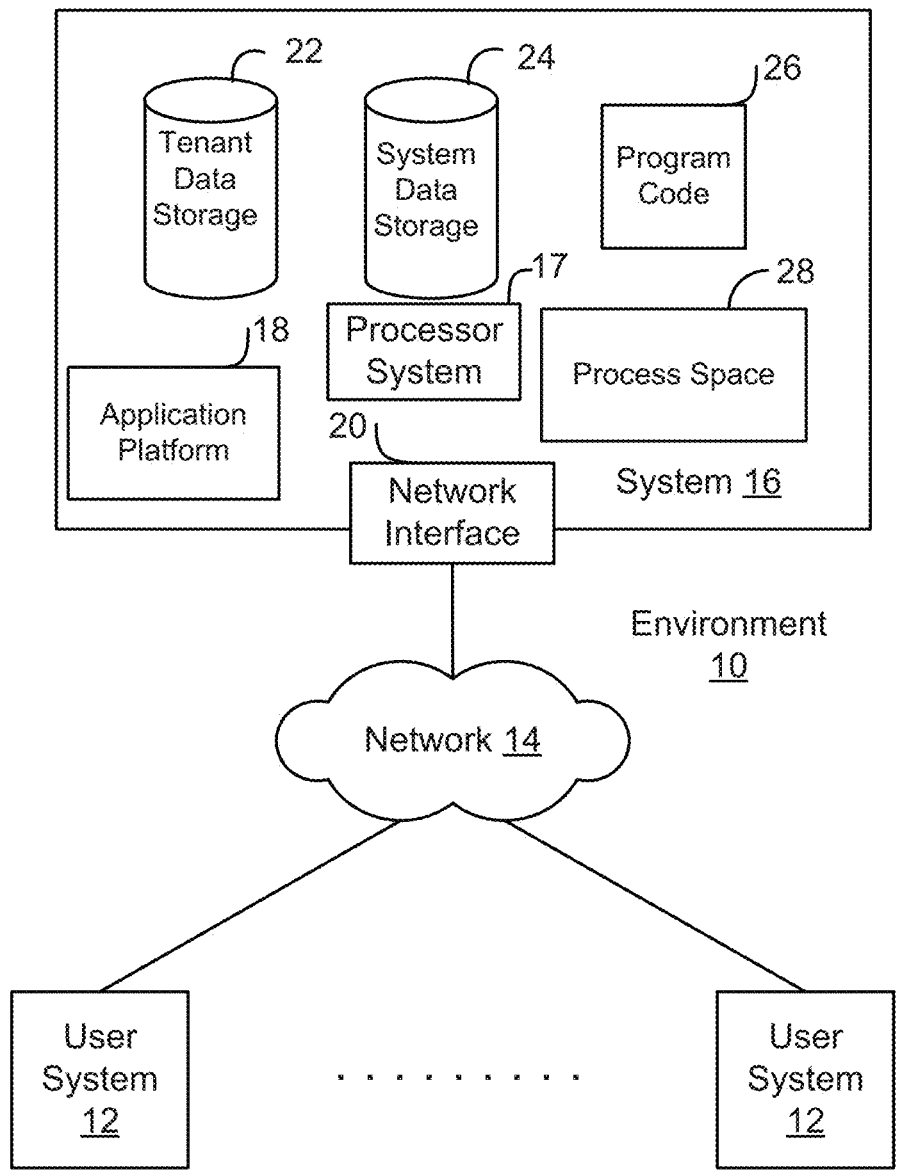
FIG. 1A is a block diagram illustrating an example of an environment in which an on-demand database service can be used according to various embodiments of the present disclosure.

FIG. 1A shows a block diagram of an example of an environment 10 in which an on-demand database service can be used in accordance with some implementations. The environment 10 includes user systems 12, a network 14, a database system 16 (also referred to herein as a "cloud-based system"), a processor system 17, an application platform 18, a network interface 20, tenant database 22 for storing tenant data 23, system database 24 for storing system data 25, program code 26 for implementing various functions of the system 16, and process space 28 for executing database system processes and tenant-specific processes, such as running applications as part of an application hosting service. In some other implementations, environment 10 may not have all of these components or systems, or may have other components or systems instead of, or in addition to, those listed above.

In some implementations, the environment 10 is an environment in which an on-demand database service exists. An on-demand database service, such as that which can be implemented using the system 16, is a service that is made available to users outside of the enterprise(s) that own, maintain or provide access to the system 16. As described above, such users generally do not need to be concerned with building or maintaining the system 16. Instead, resources provided by the system 16 may be available for such users' use when the users need services provided by the system 16; that is, on the demand of the users. Some on-demand database services can store information from one or more tenants into tables of a common database image to form a multi-tenant database system (MTS). The term "multi-tenant database system" can refer to those systems in which various elements of hardware and software of a database system may be shared by one or more customers or tenants. For example, a given application server may simultaneously process requests for a great number of customers, and a given database table may store rows of data such as feed items for a potentially much greater number of customers. A database image can include one or more database objects. A relational database management system (RDBMS) or the equivalent can execute storage and retrieval of information against the database object(s).

Application platform 18 can be a framework that allows the applications of system 16 to execute, such as the hardware or software infrastructure of the system 16. In some implementations, the application platform 18 enables the creation, management and execution of one or more applications developed by the provider of the on-demand database service, users accessing the on-demand database service via user systems 12, or third party application developers accessing the on-demand database service via user systems 12.

In some implementations, the system 16 implements a web-based customer relationship management (CRM) system. For example, in some such implementations, the system 16 includes application servers configured to implement and execute CRM software applications as well as provide related data, code, forms, renderable web pages and documents and other information to and from user systems 12 and to store to, and retrieve from, a database system related data, objects, and Web page content. In some MTS implementations, data for multiple tenants may be stored in the same physical database object in tenant database 22. In some such implementations, tenant data is arranged in the storage medium(s) of tenant database 22 so that data of one tenant is kept logically separate from that of other tenants so that one tenant does not have access to another tenant's data, unless such data is expressly shared. The system 16 also implements applications other than, or in addition to, a CRM application. For example, the system 16 can provide tenant access to multiple hosted (standard and custom) applications, including a CRM application. User (or third party developer) applications, which may or may not include CRM, may be supported by the application platform 18. The application platform 18 manages the creation and storage of the applications into one or more database objects and the execution of the applications in one or more virtual machines in the process space of the system 16.

According to some implementations, each system 16 is configured to provide web pages, forms, applications, data and media content to user (client) systems 12 to support the access by user systems 12 as tenants of system 16. As such, system 16 provides security mechanisms to keep each tenant's data separate unless the data is shared. If more than one MTS is used, they may be located in close proximity to one another (for example, in a server farm located in a single building or campus), or they may be distributed at locations remote from one another (for example, one or more servers located in city A and one or more servers located in city B). As used herein, each MTS could include one or more logically or physically connected servers distributed locally or across one or more geographic locations. Additionally, the term "server" is meant to refer to a computing device or system, including processing hardware and process space(s), an associated storage medium such as a memory device or database, and, in some instances, a database application (for example, OODBMS or RDBMS) as is well known in the art. It should also be understood that "server system" and "server" are often used interchangeably herein. Similarly, the database objects described herein can be implemented as part of a single database, a distributed database, a collection of distributed databases, a database with redundant online or offline backups or other redundancies, etc., and can include a distributed database or storage network and associated processing intelligence.

The network 14 can be or include any network or combination of networks of systems or devices that communicate with one another. For example, the network 14 can be or include any one or any combination of a LAN (local area network), WAN (wide area network), telephone network, wireless network, cellular network, point-to-point network, star network, token ring network, hub network, or other appropriate configuration. The network 14 can include a TCP/IP (Transfer Control Protocol and Internet Protocol) network, such as the global internetwork of networks often referred to as the "Internet" (with a capital "I"). The Internet will be used in many of the examples herein. However, it should be understood that the networks that the disclosed implementations can use are not so limited, although TCP/IP is a frequently implemented protocol.

The user systems 12 can communicate with system 16 using TCP/IP and, at a higher network level, other common Internet protocols to communicate, such as HTTP, FTP, AFS, WAP, etc. In an example where HTTP is used, each user system 12 can include an HTTP client commonly referred to as a "web browser" or simply a "browser" for sending and receiving HTTP signals to and from an HTTP server of the system 16. Such an HTTP server can be implemented as the sole network interface 20 between the system 16 and the network 14, but other techniques can be used in addition to or instead of these techniques. In some implementations, the network interface 20 between the system 16 and the network 14 includes load sharing functionality, such as round-robin HTTP request distributors to balance loads and distribute incoming HTTP requests evenly over a number of servers. In MTS implementations, each of the servers can have access to the MTS data; however, other alternative configurations may be used instead.

The user systems 12 can be implemented as any computing device(s) or other data processing apparatus or systems usable by users to access the database system 16. For example, any of user systems 12 can be a desktop computer, a work station, a laptop computer, a tablet computer, a handheld computing device, a mobile cellular phone (for example, a "smartphone"), or any other Wi-Fi-enabled device, wireless access protocol (WAP)-enabled device, or other computing device capable of interfacing directly or indirectly to the Internet or other network. The terms "user system" and "computing device" are used interchangeably herein with one another and with the term "computer." As described above, each user system 12 typically executes an HTTP client, for example, a web browsing (or simply "browsing") program, such as a web browser based on the WebKit platform, Microsoft's Internet Explorer browser, Apple's Safari, Google's Chrome, Opera's browser, or Mozilla's Firefox browser, or the like, allowing a user (for example, a subscriber of on-demand services provided by the system 16) of the user system 12 to access, process and view information, pages and applications available to it from the system 16 over the network 14.

Each user system 12 also typically includes one or more user input devices, such as a keyboard, a mouse, a trackball, a touch pad, a touch screen, a pen or stylus or the like, for interacting with a graphical user interface (GUI) provided by the browser on a display (for example, a monitor screen, liquid crystal display (LCD), light-emitting diode (LED) display, among other possibilities) of the user system 12 in conjunction with pages, forms, applications and other information provided by the system 16 or other systems or servers. For example, the user interface device can be used to access data and applications hosted by system 16, and to perform searches on stored data, and otherwise allow a user to interact with various GUI pages that may be presented to a user. As discussed above, implementations are suitable for use with the Internet, although other networks can be used instead of or in addition to the Internet, such as an intranet, an extranet, a virtual private network (VPN), a non-TCP/IP based network, any LAN or WAN or the like.

The users of user systems 12 may differ in their respective capacities, and the capacity of a particular user system 12 can be entirely determined by permissions (permission levels) for the current user of such user system. For example, where a salesperson is using a particular user system 12 to interact with the system 16, that user system can have the capacities allotted to the salesperson. However, while an administrator is using that user system 12 to interact with the system 16, that user system can have the capacities allotted to that administrator. Where a hierarchical role model is used, users at one permission level can have access to applications, data, and database information accessible by a lower permission level user, but may not have access to certain applications, database information, and data accessible by a user at a higher permission level. Thus, different users generally will have different capabilities with regard to accessing and modifying application and database information, depending on the users' respective security or permission levels (also referred to as "authorizations").

According to some implementations, each user system 12 and some or all of its components are operator-configurable using applications, such as a browser, including computer code executed using a central processing unit (CPU) such as an Intel Pentium® processor or the like. Similarly, the system 16 (and additional instances of an MTS, where more than one is present) and all of its components can be operator-configurable using application(s) including computer code to run using the processor system 17, which may be implemented to include a CPU, which may include an Intel Pentium® processor or the like, or multiple CPUs.

The system 16 includes tangible computer-readable media having non-transitory instructions stored thereon/in that are executable by or used to program a server or other computing system (or collection of such servers or computing systems) to perform some of the implementation of processes described herein. For example, computer program code 26 can implement instructions for operating and configuring the system 16 to intercommunicate and to process web pages, applications and other data and media content as described herein. In some implementations, the computer code 26 can be downloadable and stored on a hard disk, but the entire program code, or portions thereof, also can be stored in any other volatile or non-volatile memory medium or device as is well known, such as a ROM or RAM, or provided on any media capable of storing program code, such as any type of rotating media including floppy disks, optical discs, digital versatile disks (DVD), compact disks (CD), microdrives, and magneto-optical disks, and magnetic or optical cards, nanosystems (including molecular memory ICs), or any other type of computer-readable medium or device suitable for storing instructions or data. Additionally, the entire program code, or portions thereof, may be transmitted and downloaded from a software source over a transmission medium, for example, over the Internet, or from another server, as is well known, or transmitted over any other existing network connection as is well known (for example, extranet, VPN, LAN, etc.) using any communication medium and protocols (for example, TCP/IP, HTTP, HTTPS, Ethernet, etc.) as are well known. It will also be appreciated that computer code for the disclosed implementations can be realized in any programming language that can be executed on a server or other computing system such as, for example, C, C++, HTML, any other markup language, Java™, JavaScript, ActiveX, any other scripting language, such as VBScript, and many other programming languages as are well known may be used. (Java™ is a trademark of Sun Microsystems, Inc.).

Figure 1B:
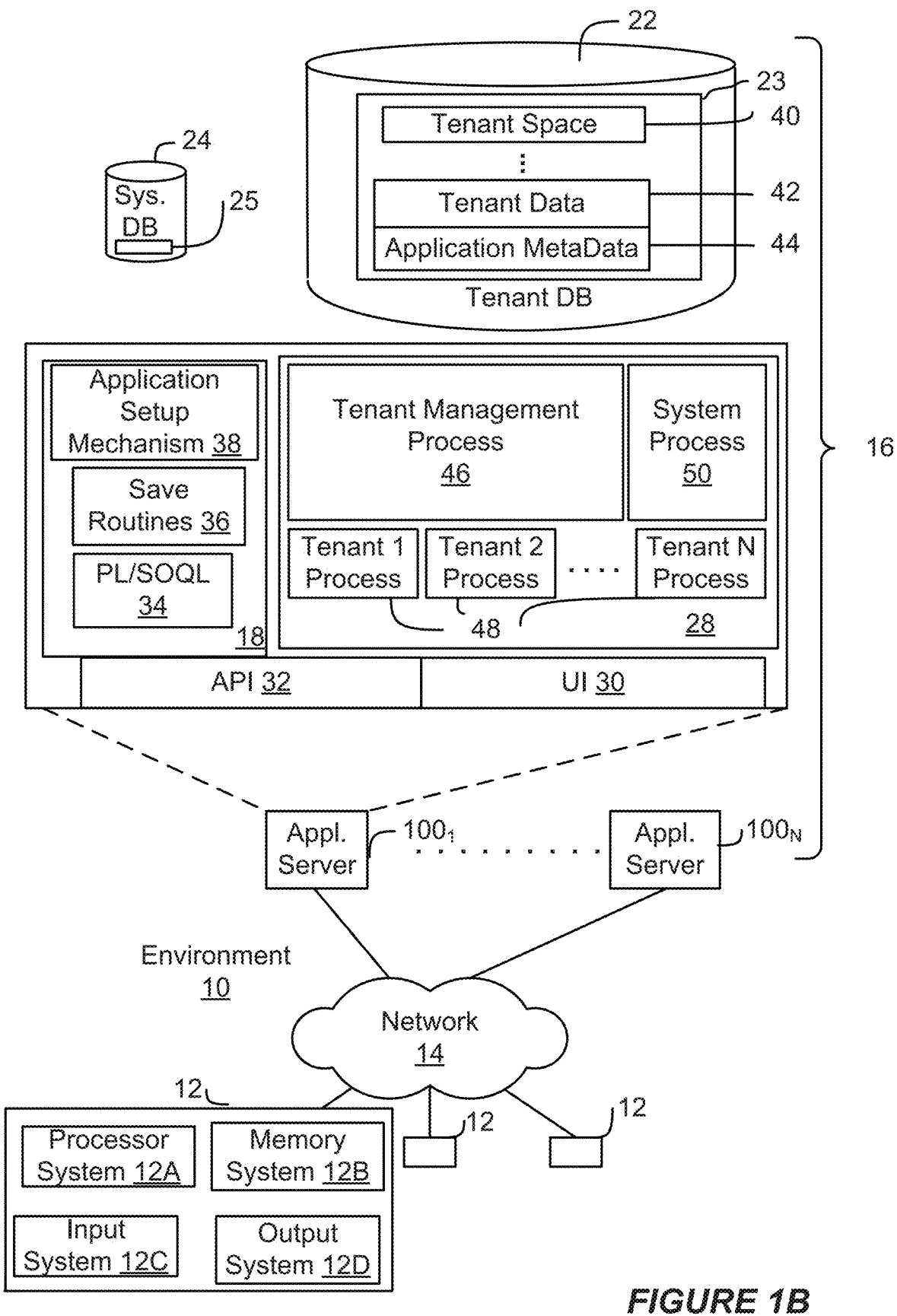
FIG. 1B is a block diagram illustrating examples of implementations of elements of FIG. 1A and examples of interconnections between these elements according to various embodiments of the present disclosure.

FIG. 1B shows a block diagram with examples of implementations of elements of FIG. 1A and examples of interconnections between these elements according to some implementations. That is, FIG. 1B also illustrates environment 10, but FIG. 1B, various elements of the system 16 and various interconnections between such elements are shown with more specificity according to some more specific implementations. Additionally, in FIG. 1B, the user system 12 includes a processor system 12A, a memory system 12B, an input system 12C, and an output system 12D. The processor system 12A can include any suitable combination of one or more processors. The memory system 12B can include any suitable combination of one or more memory devices. The input system 12C can include any suitable combination of input devices, such as one or more touchscreen interfaces, keyboards, mice, trackballs, scanners, cameras, or interfaces to networks. The output system 12D can include any suitable combination of output devices, such as one or more display devices, printers, or interfaces to networks.

In FIG. 1B, the network interface 20 is implemented as a set of HTTP application servers $100_1$-$100_N$. Each application server 100, also referred to herein as an "app server", is configured to communicate with tenant database 22 and the tenant data 23 therein, as well as system database 24 and the system data 25 therein, to serve requests received from the user systems 12. The tenant data 23 can be divided into individual tenant storage spaces 40, which can be physically or logically arranged or divided. Within each tenant storage space 40, user storage 42 and application metadata 44 can similarly be allocated for each user. For example, a copy of a user's most recently used (MRU) items can be stored to user storage 42. Similarly, a copy of MRU items for an entire organization that is a tenant can be stored to tenant storage space 40.

The process space 28 includes system process space 102, individual tenant process spaces 48 and a tenant management process space 46. The application platform 18 includes an application setup mechanism 38 that supports application developers' creation and management of applications. Such applications and others can be saved as metadata into tenant database 22 by save routines 36 for execution by subscribers as one or more tenant process spaces 48 managed by tenant management process 46, for example. Invocations to such applications can be coded using PL/SOQL 34, which provides a programming language style interface extension to API 32. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, issued on Jun. 1, 2010, and hereby incorporated by reference in its entirety and for all purposes. Invocations to applications can be detected by one or more system processes, which manage retrieving application metadata 44 for the subscriber making the invocation and executing the metadata as an application in a virtual machine.

The system 16 of FIG. 1B also includes a user interface (UI) 30 and an application programming interface (API) 32 to system 16 resident processes to users or developers at user systems 12. In some other implementations, the environment 10 may not have the same elements as those listed above or may have other elements instead of, or in addition to, those listed above.

Each application server 100 can be communicably coupled with tenant database 22 and system database 24, for example, having access to tenant data 23 and system data 25, respectively, via a different network connection. For example, one application server $100_1$ can be coupled via the network 14 (for example, the Internet), another application server $100_{N-1}$ can be coupled via a direct network link, and another application server $100_N$ can be coupled by yet a different network connection. Transfer Control Protocol and Internet Protocol (TCP/IP) are examples of typical protocols that can be used for communicating between application servers 100 and the system 16. However, it will be apparent to one skilled in the art that other transport protocols can be used to optimize the system 16 depending on the network interconnections used.

In some implementations, each application server 100 is configured to handle requests for any user associated with any organization that is a tenant of the system 16. Because it can be desirable to be able to add and remove application servers 100 from the server pool at any time and for various reasons, in some implementations there is no server affinity for a user or organization to a specific application server 100. In some such implementations, an interface system implementing a load balancing function (for example, an F5 Big-IP load balancer) is communicably coupled between the application servers 100 and the user systems 12 to distribute requests to the application servers 100. In one implementation, the load balancer uses a least-connections algorithm to route user requests to the application servers 100. Other examples of load balancing algorithms, such as round robin and observed-response-time, also can be used. For example, in some instances, three consecutive requests from the same user could hit three different application servers 100, and three requests from different users could hit the same application server 100. In this manner, by way of example, system 16 can be a multi-tenant system in which system 16 handles storage of, and access to, different objects, data and applications across disparate users and organizations.

In one example of a storage use case, one tenant can be a company that employs a sales force where each salesperson uses system 16 to manage aspects of their sales. A user can maintain contact data, leads data, customer follow-up data, performance data, goals and progress data, etc., all applicable to that user's personal sales process (for example, in tenant database 22). In an example of an MTS arrangement, because all of the data and the applications to access, view, modify, report, transmit, calculate, etc., can be maintained and accessed by a user system 12 having little more than network access, the user can manage his or her sales efforts and cycles from any of many different user systems. For example, when a salesperson is visiting a customer and the customer has Internet access in their lobby, the salesperson can obtain critical updates regarding that customer while waiting for the customer to arrive in the lobby.

While each user's data can be stored separately from other users' data regardless of the employers of each user, some data can be organization-wide data shared or accessible by several users or all of the users for a given organization that is a tenant. Thus, there can be some data structures managed by system 16 that are allocated at the tenant level while other data structures can be managed at the user level. Because an MTS can support multiple tenants including possible competitors, the MTS can have security protocols that keep data, applications, and application use separate. Also, because many tenants may opt for access to an MTS rather than maintain their own system, redundancy, up-time, and backup are additional functions that can be implemented in the MTS. In addition to user-specific data and tenant-specific data, the system 16 also can maintain system level data usable by multiple tenants or other data. Such system level data can include industry reports, news, postings, and the like that are sharable among tenants.

In some implementations, the user systems 12 (which also can be client systems) communicate with the application servers 100 to request and update system-level and tenant-level data from the system 16. Such requests and updates can involve sending one or more queries to tenant database 22 or system database 24. The system 16 (for example, an application server 100 in the system 16) can automatically generate one or more SQL statements (for example, one or more SQL queries) designed to access the desired information. System database 24 can generate query plans to access the requested data from the database. The term "query plan" generally refers to one or more operations used to access information in a database system.

Each database can generally be viewed as a collection of objects, such as a set of logical tables, containing data fitted into predefined or customizable categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or element of a table can contain an instance of data for each category defined by the fields. For example, a CRM database can include a table that describes a customer with fields for basic contact information such as name, address, phone number, fax number, etc. Another table can describe a purchase order, including fields for information such as customer, product, sale price, date, etc. In some MTS implementations, standard entity tables can be provided for use by all tenants. For CRM database applications, such standard entities can include tables for case, account, contact, lead, and opportunity data objects, each containing pre-defined fields. As used herein, the term "entity" also may be used interchangeably with "object" and "table."

In some MTS implementations, tenants are allowed to create and store custom objects, or may be allowed to customize standard entities or objects, for example by creating custom fields for standard objects, including custom index fields. Commonly assigned U.S. Pat. No. 7,779,039, titled CUSTOM ENTITIES AND FIELDS IN A MULTI-TENANT DATABASE SYSTEM, by Weissman et al., issued on Aug. 17, 2010, and hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. It is transparent to customers that their multiple "tables" are in fact stored in one large table or that their data may be stored in the same table as the data of other customers.

II. Distributed Audience Computation Software Service

As noted previously, software platforms performing audience computation functionality involves loading, creating and manipulating large sets of sparse and random data in-memory, which forces an upper limit on the number of list elements, bound by available memory and processing power. Conventional solutions for such computation typically depends on one "node" (also referred to herein as a "compute node," "server node," or "server") that often results in "out of memory" errors as well as processing timeout for the node. This may renders the product feature unusable, and does not perform or scale particularly when the processing involves multiple recipient and suppression lists, each of which could include many (e.g., thousands or millions) entries.

Embodiments of the present disclosure address these and other issues by providing a distributed audience computation service, wherein processing is distributed across multiple clusters of nodes and executed in parallel. In this manner, embodiments of the present disclosure can offer an order of magnitude improvement in processing time, and compute audience lists at scale, without the resource limitations of conventional systems. Embodiments of the present disclosure are more reliable and deterministic than conventional systems, and can provide solutions for a wide variety of audience computation use cases.

Figure 2A:
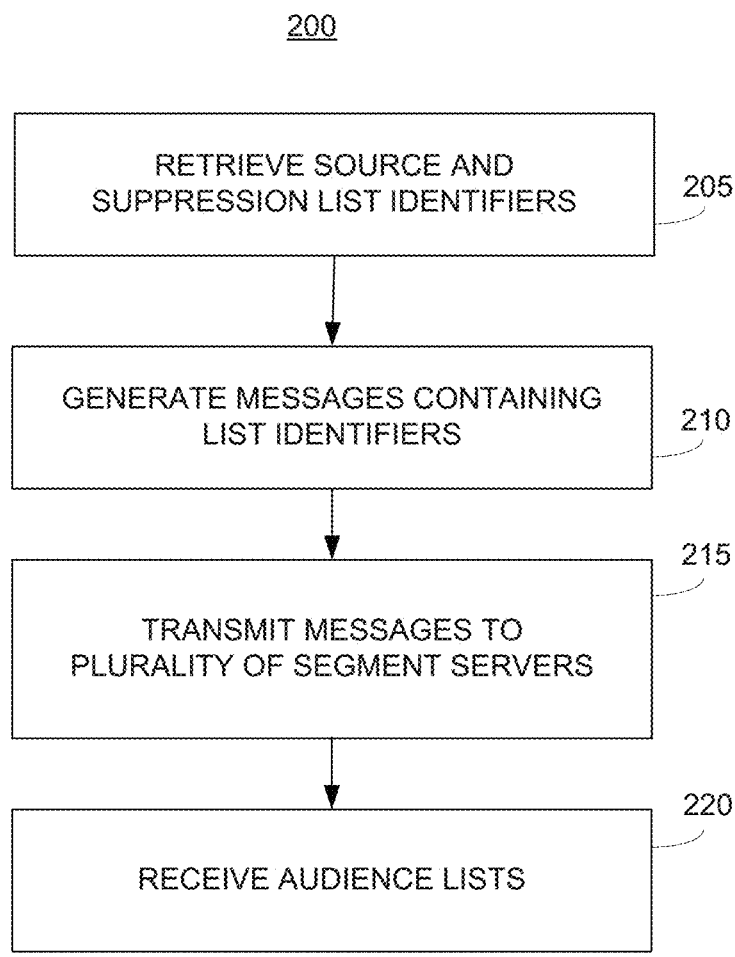
FIGS. 2A and 2B are flow diagrams illustrating examples of processes according to various embodiments of the present disclosure.

FIG. 2A is a flow diagram illustrating an example of a process 200 according to various aspects of the present disclosure. Any combination and/or subset of the elements of the methods depicted herein (including method 200 in FIG. 2A or method 250 in FIG. 2B) may be combined with each other, selectively performed or not performed based on various conditions, repeated any desired number of times, and practiced in any suitable order and in conjunction with any suitable system, device, and/or process. The methods described and depicted herein can be implemented in any suitable manner, such as through software operating on one or more computer systems. The software may comprise computer-readable instructions stored in a tangible computer-readable medium (such as the memory of a computer system) and can be executed by one or more processors to perform the methods of various embodiments.

Figure 6:
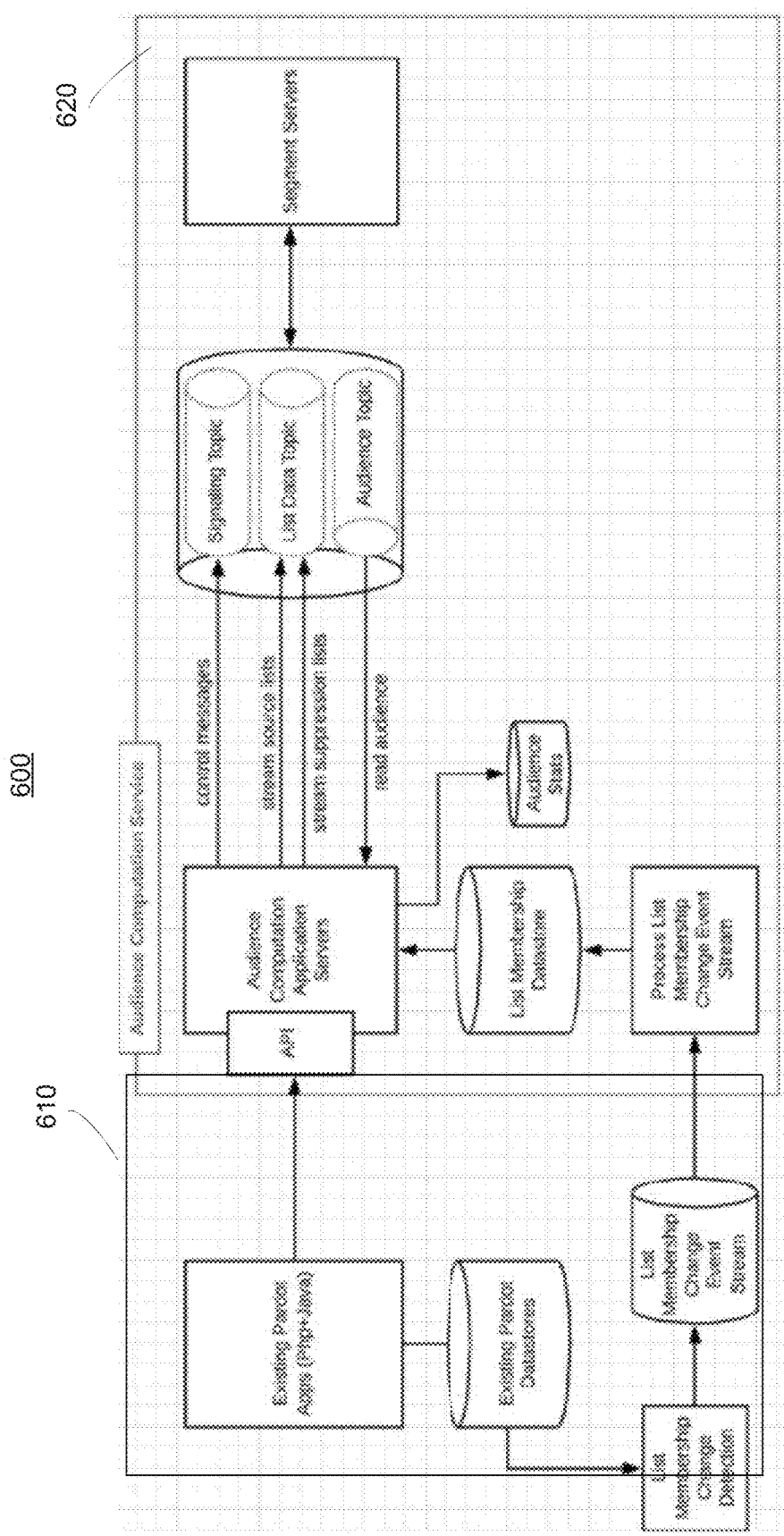
FIG. 6 is a functional block diagram illustrating aspects of audience computation according to various embodiments of the present disclosure.

Process 200 may be performed by an application server computer system, such as application server 610 in FIG. 6. In this example, process 200 includes retrieving (e.g., from a database or memory) source list identifiers and suppression list identifiers (205), generating messages including indications of portions of the source list identifiers and suppression list identifiers (210), transmitting each message to each of a plurality of segment servers (215), and receiving one or more audience lists from the plurality of segment servers (220).

Figure 2B:
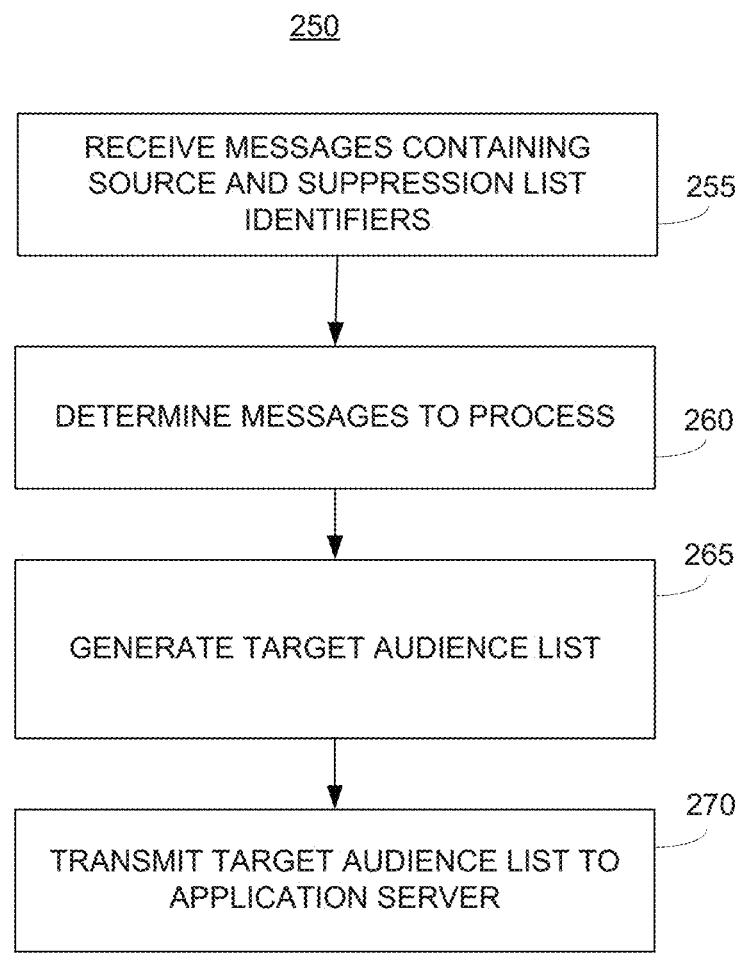

FIG. 2B is a flow diagram illustrating another example of a process 250 according to various aspects of the present disclosure. Process 250 may be performed by a segment server, such as one of segment servers 620 in FIG. 6. In this example, process 250 includes receiving messages from an application server that include indications of source list identifiers and suppression list identifiers (255), determining which messages to process (260), generating a target audience list based on the source list identifiers and suppression list identifiers (265), and transmitting the target audience list to the application server (270).

Figure 3:
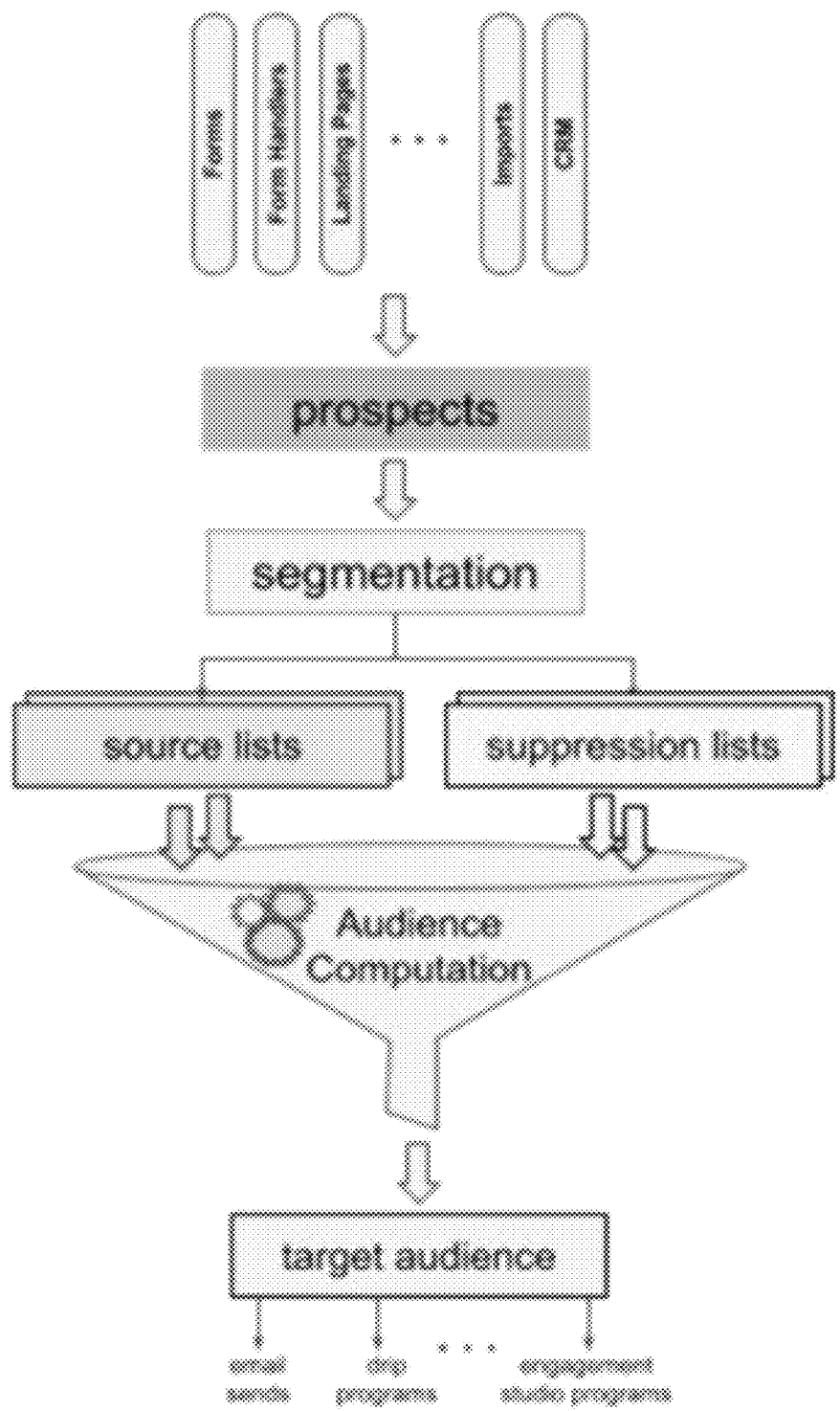
FIGS. 3 and 4A-4E are functional block diagrams illustrating aspects of audience computation according to various embodiments of the present disclosure.
Figure 4A:
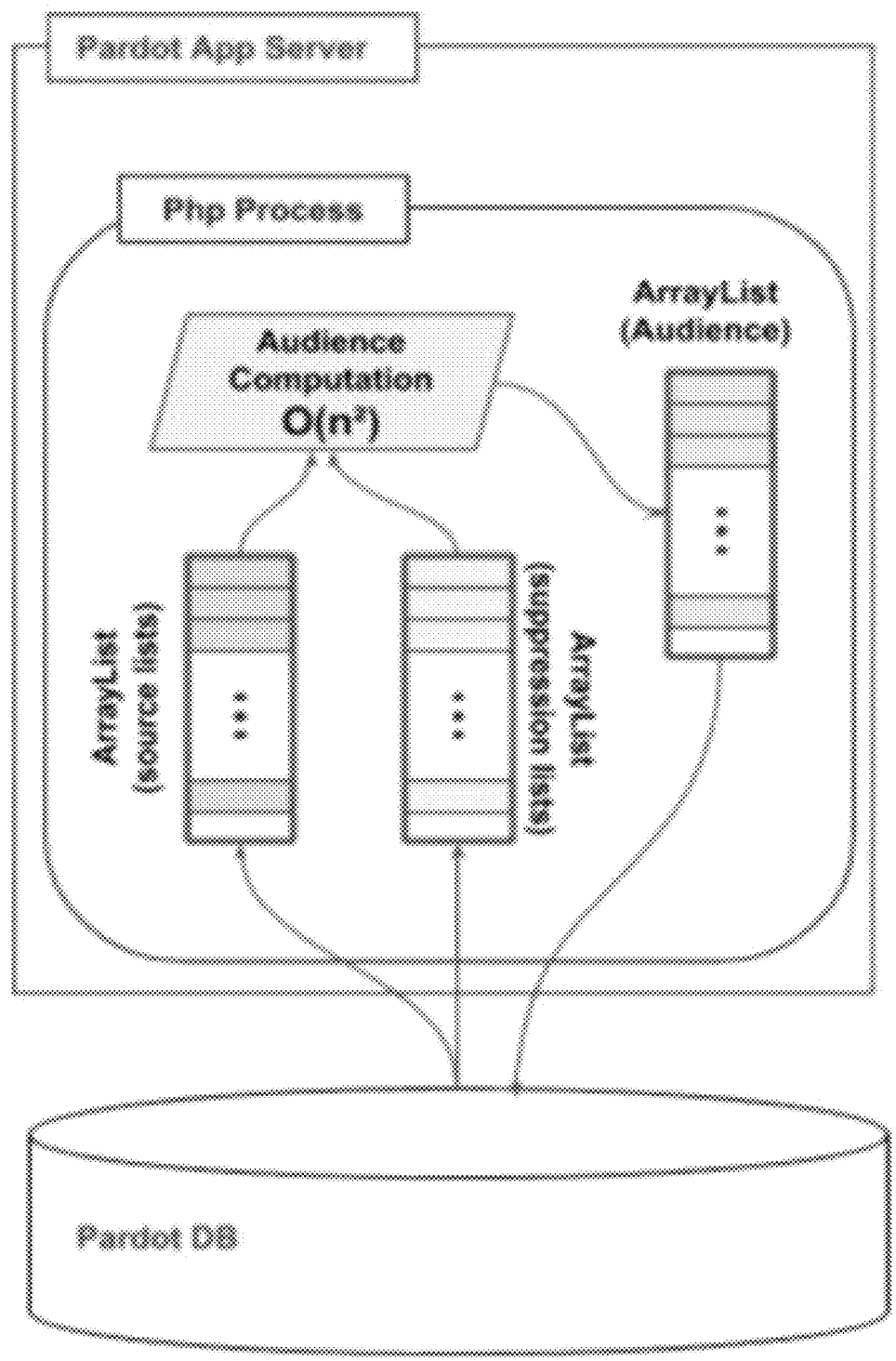

FIGS. 3 and 4A are functional block diagrams illustrating audience computation. As generally depicted in FIG. 3, potential prospects are identified from different sources (e.g., forms, form handlers, landing pages, etc.) and segmented based on various criteria. For example, a the source list (also referred to herein as "recipient list) may hold the email addresses, phone numbers for text messages, or other contact information for prospects who successfully met the criteria to receive an electronic communication. The suppression list, by contrast may hold the contact information for prospects who should not be included in the target audience for one reason or another (e.g., because the prospect is inactive or opted-out from receiving such communications).

Typically, audience computation to generate the target audience is performed by a single application server interacting with a database as shown. In this example, one personal home page (PHP) process performs the audience computation by creating one array list for source lists and one array list for suppression lists. The process then performs the set of operations to subtract the entries in the suppression array list from the entries in source list to create the audience array list which is then written back to the database.

This approach has a number of drawbacks. The time complexity of this approach is $O(n^2)$ and space complexity is $O(n)$. In the this approach, any duplicate entries across source lists or across suppression lists may need to be processed multiple times. This approach does not scale and the computation time is often high, as a single PHP process is processing all the data in the source and suppression lists. Additionally, since the current audience computation mechanism loads the records into memory, it may encounter issues where the PHP process runs out of memory if the number of records being processed is sufficiently large. Each of these issues may additionally result in a degraded user experience for pages where the user is waiting/blocked for the audience computation to complete.

In embodiments of the present disclosure, by contrast, the audience computation processing is spread across multiple nodes and also de-duplicates the elements in the source lists. In some embodiments, multiple recipient and suppression lists may be read from a database and streamed over to a backend message queueing system where the dataset (list entries) is dynamically partitioned and enqueued into one or more of the messaging queues, which then are consumed by "segmentation servers" that either keeps or drops the given email address (or other contact information) from the final list.

As discussed in more detail below, embodiments of the present disclosure may employ the segmentation servers in conjunction with a hashmap data structure to manipulate/manage the incoming list entry. In this manner, the hashmap will help ensure that any element duplicated or present in multiple recipient lists is automatically de-duplicated.

Figure 4B:
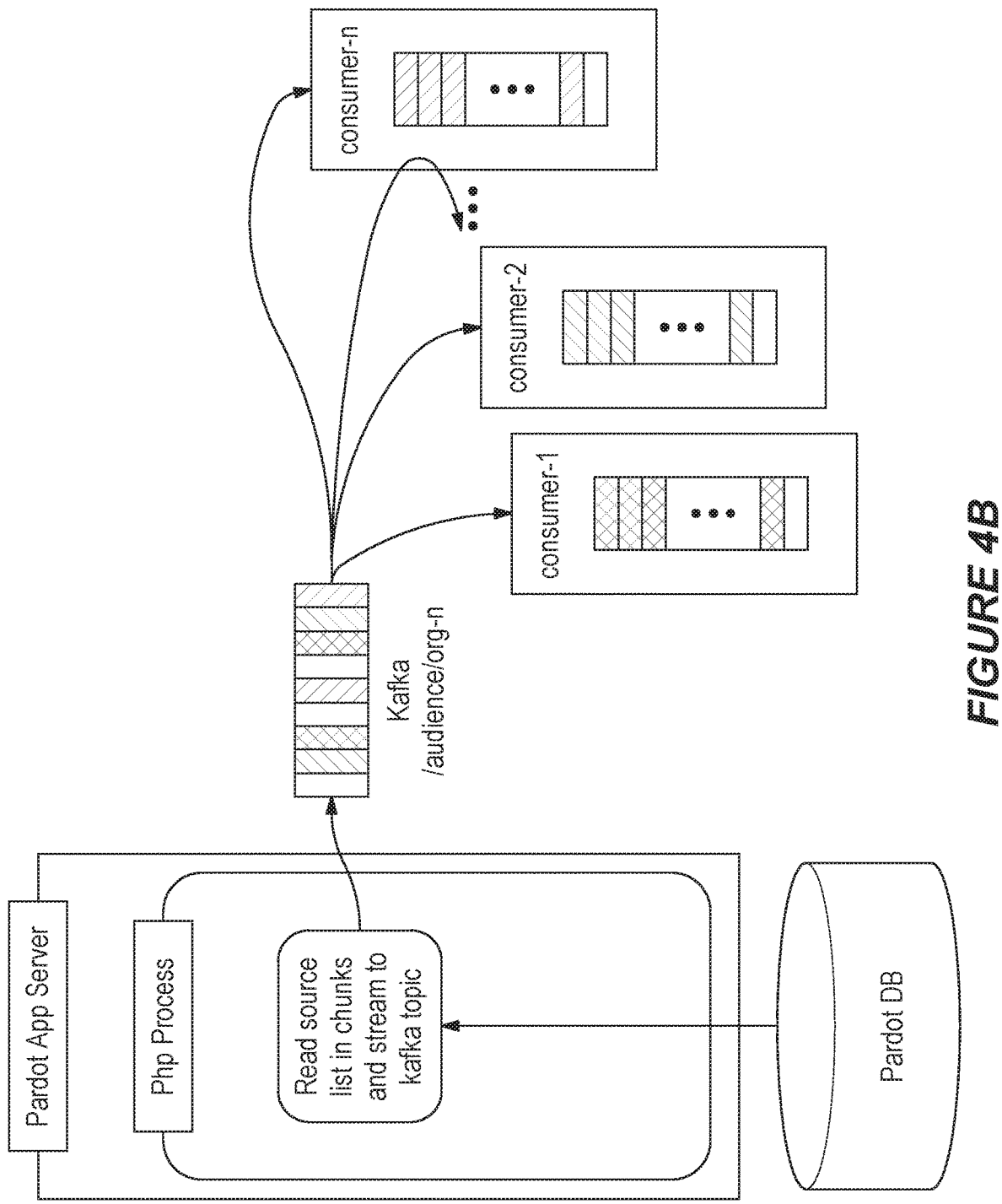
Figure 4C:
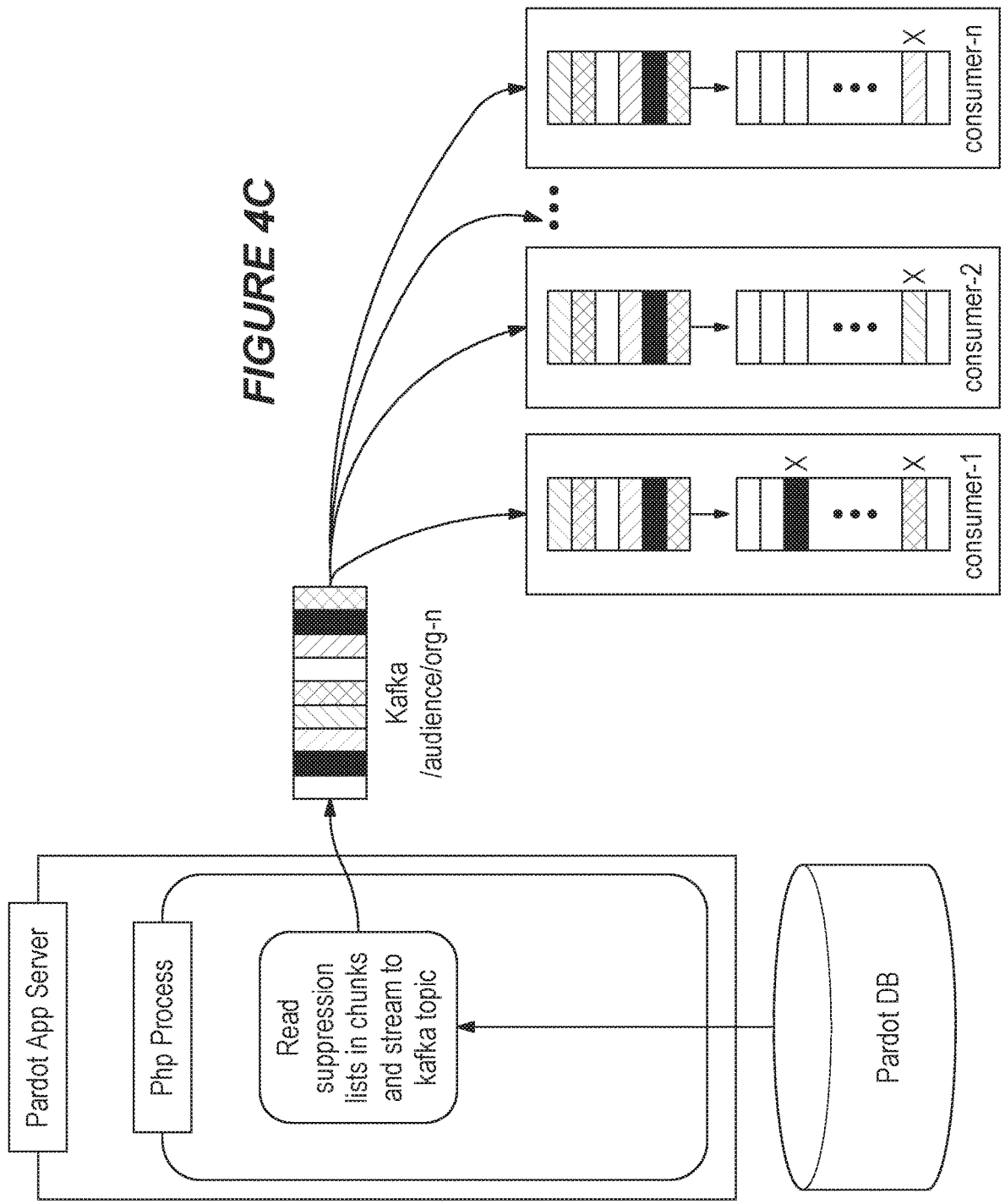

FIGS. 4B and 4C are functional block diagrams illustrating aspects of audience list generation according to various embodiments of the present disclosure. In FIG. 4B, a process (a PHP process in this example) starts with a start-source-list message and then process reads all elements from all source lists in chunks and writes these entries to a specific kafka topic dedicated for audience computation. In embodiments of the present disclosure, a stream-processing platform (e.g, a kafka subsystem in this example) may be used to stream the entries in the source and suppression lists to any number of consumer machines for processing.

The consumers in FIG. 4B receive all the entries streamed via kafka, but only process their respective portion of entries (e.g., determined by using a hash function), and thus a given entry from a source list is stored only in one consumer in a hashmap. Any duplication of the entries in the source list will automatically be eliminated by the functionality of the hashmap, and only one copy of the entry is saved on one consumer.

Once all the entries across all source lists is streamed, a second stage of processing begins, as illustrated in FIG. 4C. In the second stage, the PHP process starts with a start-suppression-list message and then reads all elements from all suppression lists in chunks and writes these entries to the same kafka topic. All the messages are picked up by all consumers and a delete-from-hash-table operation is executed for all entries from the suppression lists. Once all the suppression list entries are processed, the resulting entries in each consumer are the relevant audience entries for the target audience list.

In the example depicted in FIGS. 4B and 4C, once the second stage of processing is complete, the PHP process will write a "fetch-audience-lists" message, and in response to this message all the consumer machines will start streaming the contents of the hash-map via the kafka topic, which is read by the PHP process and inserted into the relevant target audience table in the database.

Figure 4D:
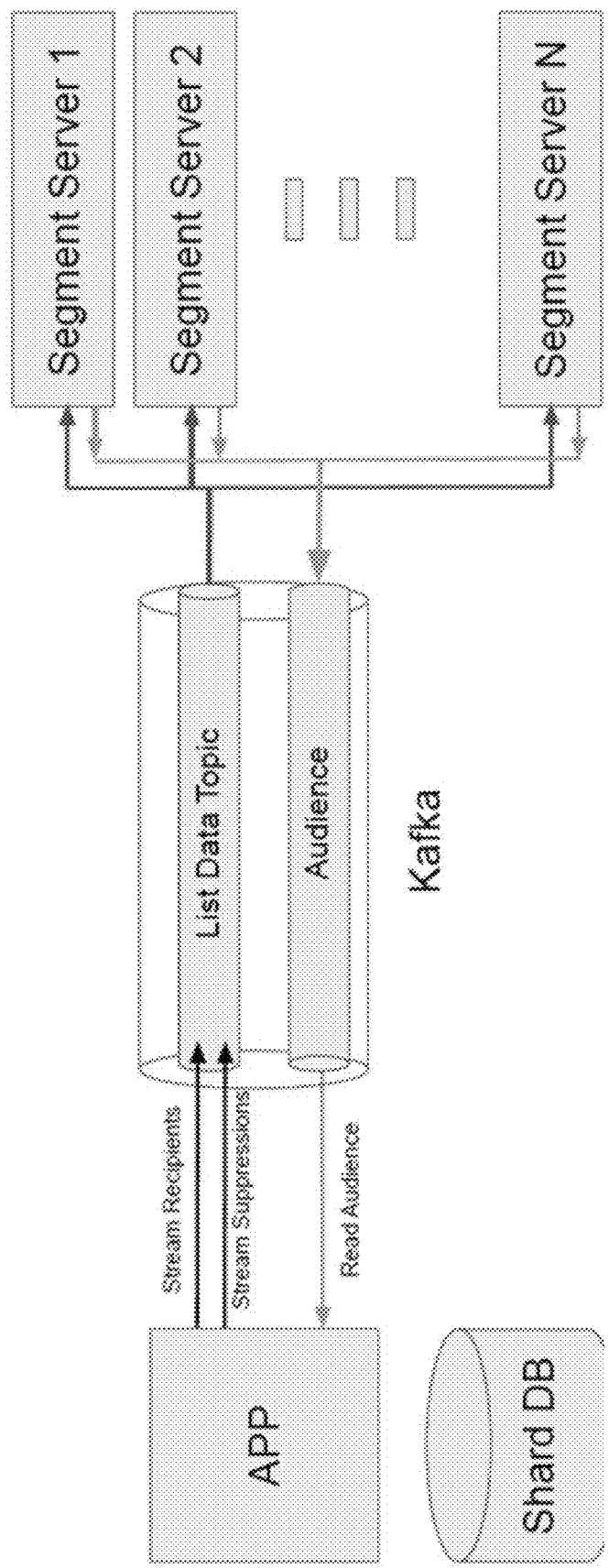

FIG. 4D is a functional block diagram illustrating another example of audience computation according to various embodiments of the present disclosure. In this example, an application server (labeled "APP") is in communication with a database ("Shard DB") and streams recipients (source list elements) and suppressions (suppression list elements) via a stream-processing platform (kafka in this example) to a plurality of segment servers.

In this example, the application server retrieves (205), from the database (or memory) a source list of identifiers and a suppression list of identifiers. These identifiers may also be referred to as "entries." The identifiers may include, for example, contact information (such as an email address or phone number for a prospect) as well as identification information (such as a name of the prospect), or other information regarding the prospect.

The application server generates messages containing the source list identifiers (210) and transmits them (via the streaming platform in this example) to the plurality of segment servers (215). In one particular example, the application server may generate a first message that includes an indication of a first portion of the source list identifiers for a first target audience, and a first key associated with the target audience. The application server may further generate a second message that includes an indication of a second portion of the source list identifiers for a second target audience, and a second key associated with the second target audience. The application server receives one or more audience lists (220) generated by the segment servers (described in more detail below).

As with the example depicted in FIGS. 4B and 4C, the consumers (the segment servers) receive (255) all the streamed messages (entries), but a respective segment server will determine which messages to process (260) so that it only saves the respective messages/entries intended for that respective server. For example, the segment servers may perform a hash function using a key for each entry to determine which entry to save. In this manner, a given entry from the source list is stored by only one segment server. Additionally, any duplication of the entries in source list will automatically be eliminated by the hashmap functionality, and only one copy of the entry is saved on one consumer.

Figure 4E:
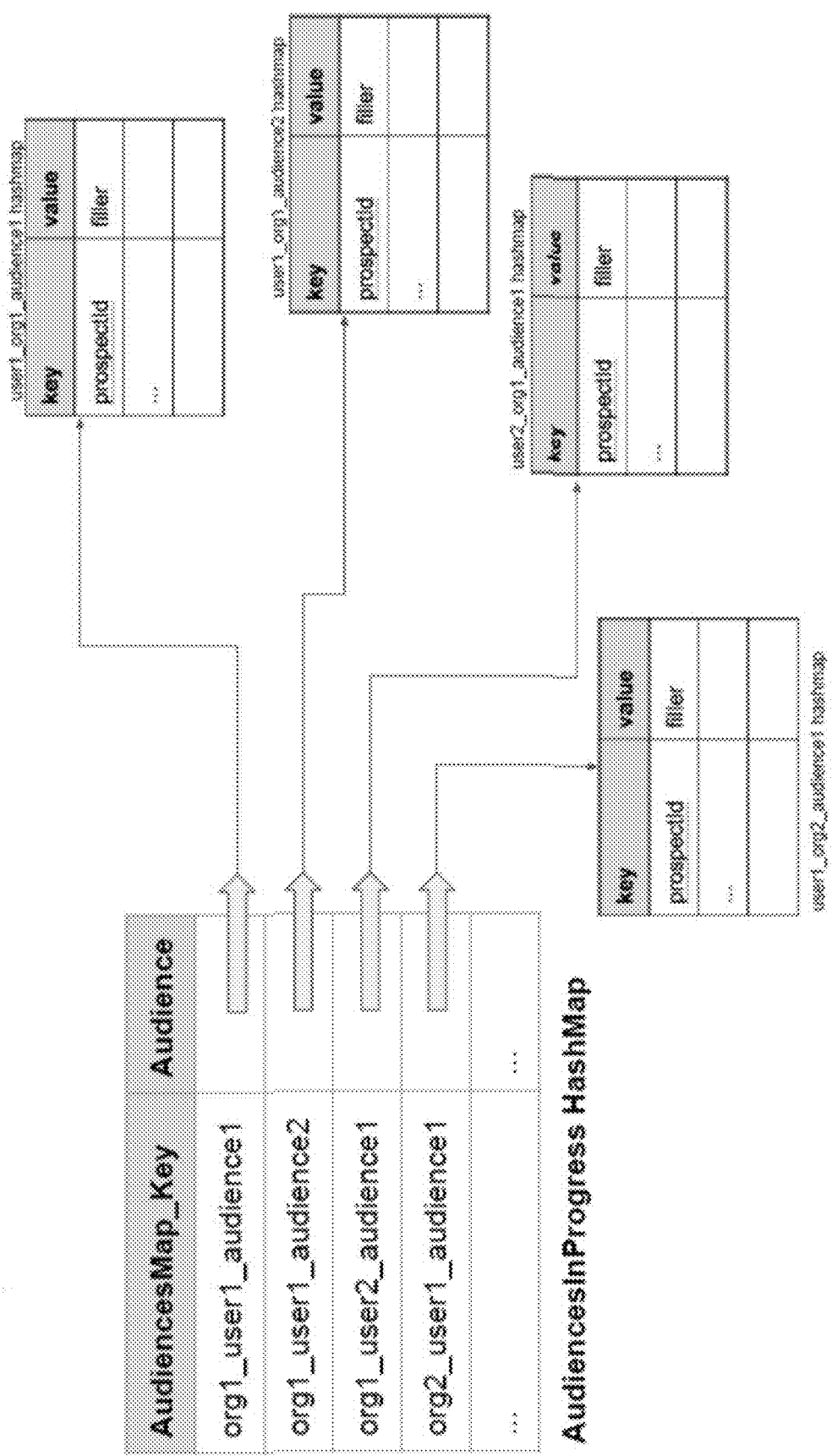

A segment server may process any number of audience lists. FIG. 4E illustrates an example of a single segment server maintaining multiple hashmaps. In this example, the 'key' for the hashmap is the "prospect id." However, any other suitable field may be used for computing a particular audience.

The application server generates (210) and transmits (215) one or more messages containing indications of suppression list identifiers to the plurality of segment servers. Continuing the example where a first and second message containing portions of the source list identifiers are generated and sent, the application server may generate a third message that includes an indication of a first portion of the suppression list identifiers for the first target audience, and the first key. The application server may further generate a fourth message that includes an indication of a second portion of the suppression list identifiers for the second target audience, and the second key.

As one or more messages containing the source/recipient list is received (255) by the segment server, the segment server identifies an entry to process (260) and the entry is added to the hashmap (e.g., using a HashMap.put( ) operation). Conversely, entries that are received from the suppression list are removed (e.g., using a HashMap.remove( ) operation) from the hashmap. These operations are performed to generate (265) the target audience list, which includes the resulting elements in the hashmap after the additions and removals described above.

In the example with the first, second, third, and fourth messages transmitted by the application server to the plurality of segment servers, a segment server may determine (e.g., based on the first key) that the segment server computer system is to process the first message and the third message. The segment server may similarly determine that it is not to process the second and fourth message (e.g., because a second segment server will handle those messages).

The segment server may then transmit (270) the target audience list to the application server so that an application running on the application server can perform the actual email send operation. In some embodiments, the segment server may transmit (270) the target audience list to the application server upon completion. Additionally or alternatively, the application server may transmit (270) the target audience list to the application server in response to a request from the application server.

In some embodiments, the segment server may remove the hashmap (e.g., deleting it from the segment server's memory) subsequent to transmitting the first target audience list to the application server. In some cases, the segment server may wait for an acknowledgement from the application server (e.g., to confirm the application server received the audience list) and then delete hashmap to free up memory for future audience lists or other activities.

Embodiments of the present disclosure may be implemented using a data agnostic framework, thereby allowing such embodiments to perform operations using any key and over any dataset sizes in a performant manner. Among other advantages, embodiments of the present disclosure can help alleviate the set computation processing load from an expensive monolithic main database bound by a single server, and offload it to less expensive and scalable resources in an audience computation service.

FIGS. 4F and 4G illustrate examples of message formats that may be used in conjunction with embodiments of the present disclosure. The example in FIG. 4F, for example, illustrates an example of a message format for use with source/recipient list entries or suppression list entries. In some embodiments, as depicted in FIG. 4F for example, the source list of identifiers or suppression list of identifiers for the target audience lists may include a respective entry for each respective audience member, and each respective entry may includes a plurality of fields. In some embodiments, instead of a segment server determining whether to process a message/entry based on a key, the segment server may process a particular message based on the "Message sequence number" of the particular message.

The plurality of fields may include, for example, an indicator that the respective audience member is to be included in the respective audience (L) or excluded from the respective audience (S), an organization identifier, a user identifier, an audience name, or other information. The payload in this example carries the key (e.g., the prospectId described previously). FIG. 4G illustrates an example of a similar message format that may be used to transmit the audience list from the segment server to the application server. In this example, the payload carries the audience list, and the AudienceSize field returns the audience size on the corresponding Segment Server identified by SegmentID field. In some embodiments, the AudienceSize fields from the first audience message from each Segment Server may be added together to get the total audience size even before the entire audience is read.

In the context of using a stream-processing platform (such as kafka), a "signaling" topic may be used to send Control Messages between the application and segment servers to avoid contention with data and audience topics. For example, the signaling topic may be used to: create a new audience, indicate streaming has started, indicate streaming has ended, indicate an "end of stream" marker was received, get statistics, get an audience size, close an audience, and/or convey error indicator messages.

Figure 5A:
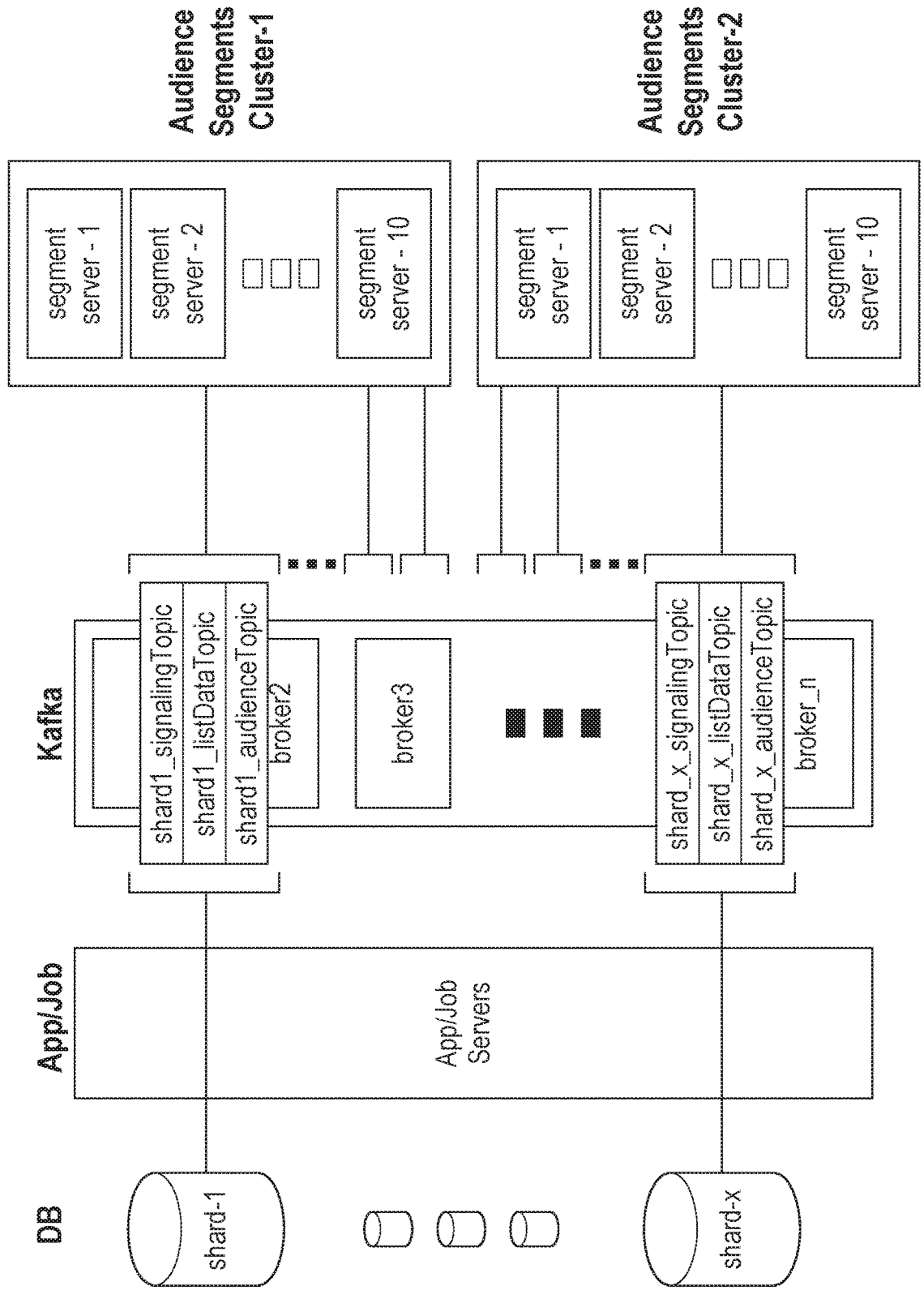
FIGS. 5A and 5B are block diagrams illustrating examples of scaling in accordance with embodiments the present disclosure.
Figure 5B:
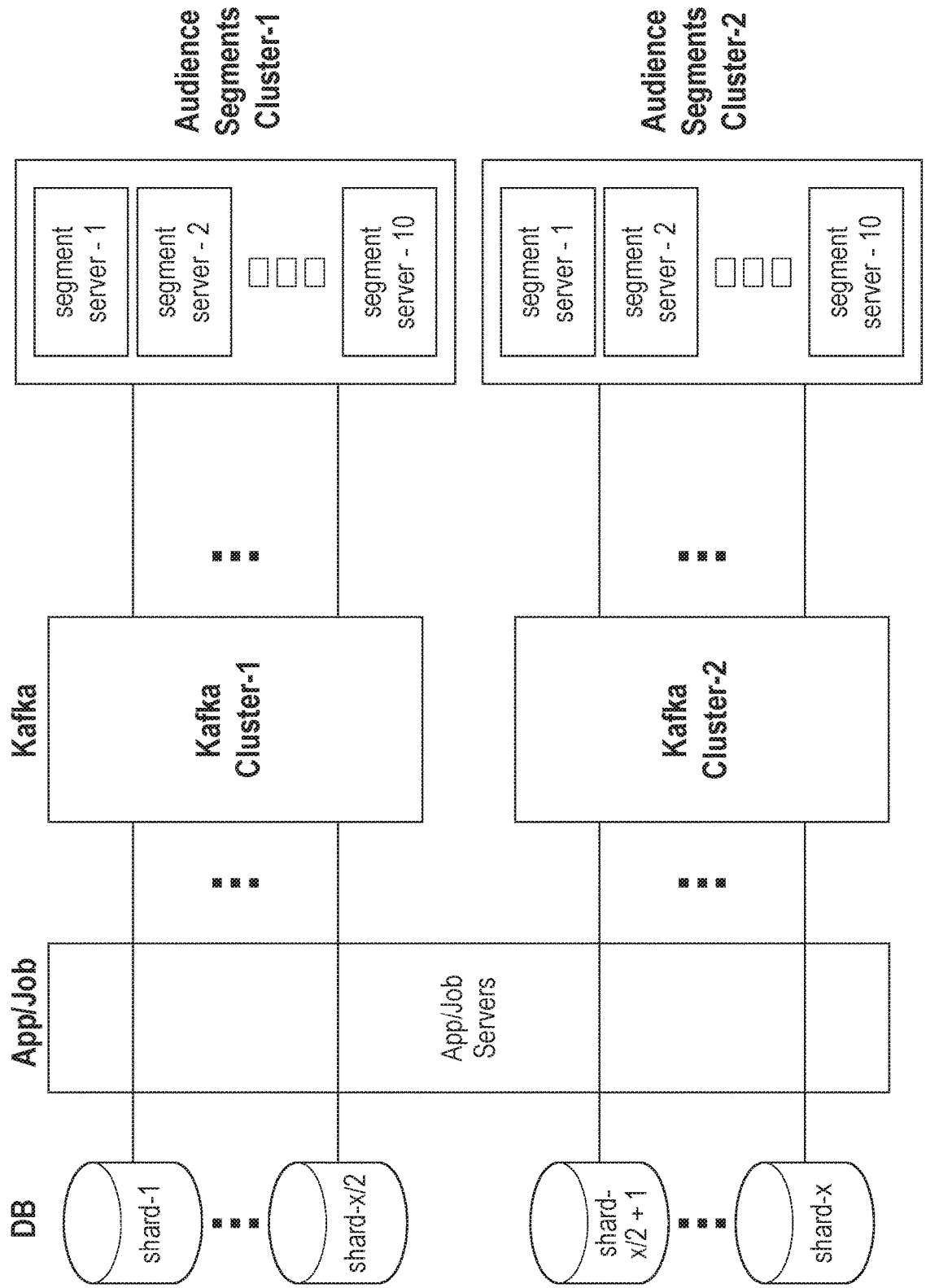

FIGS. 5A and 5B are block diagrams illustrating the scaling of embodiments of the present disclosure. In FIG. 5A, for example, a capacity model may be based on baseline tests and limits. Size topics, brokers, and segment servers may be determined based on the capacity model, and a configuration-based mapping of resources performed. The system may scale audience segment clusters and update the configuration mapping to segregate topics/shards to segment server clusters. The system may additionally define new functions to increase segments within a cluster.

FIG. 5B illustrates an example using kafka as a stream processing platform. In this example, the system may scale brokers in a kafka cluster and/or scale to an additional kafka cluster. The system may further update the configuration mapping in configuration to segregate topics/shards to segment server clusters. The system may additionally setup dedicated topics and segment servers for specific users.

In the examples described previously, each message is streamed to every consumer (segment server) and each respective segment server determines whether to process a given message. In some embodiments, however, every consumer reading every message could result in read amplification related issues. Accordingly, in some embodiments partitions may be set up in a topic based on the function ("fx( )") used by the segment servers to determine the applicability of each message. The application server may then stream messages to specific partitions after applying the fx( ) and the segment servers read from their respective specific partition. Additionally, to deal with contention issues, embodiments of the present disclosure may be adapted to increase topics, use dedicated topics, and/or dynamically create/delete topics.

Figure 5C:
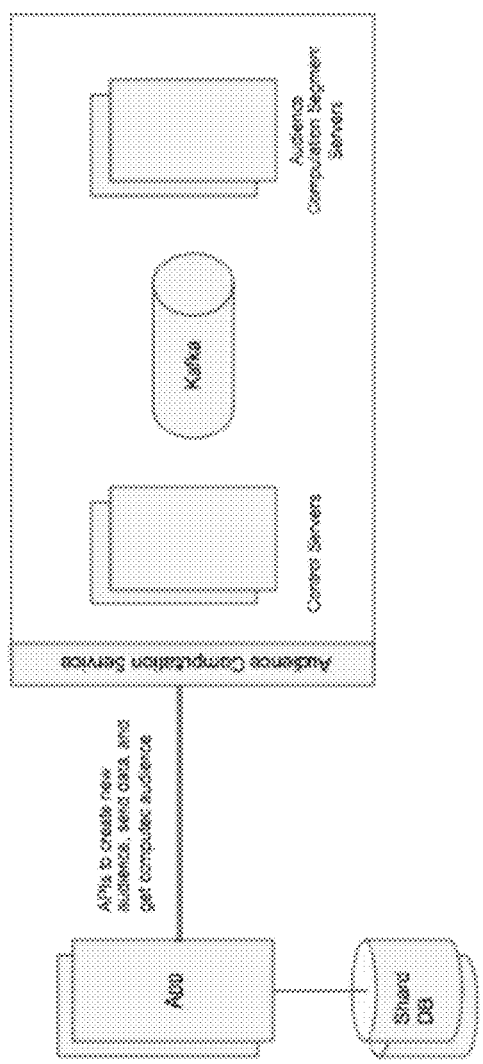
FIG. 5C is a block diagram illustrating an embodiment for audience computation as a standalone service in accordance with embodiments of the present disclosure.

FIG. 5C is a block diagram illustrating an example of an embodiment providing audience computation as a stand-alone service. In this example, the application server ("App") interfaces with the Audience Computation Service via an application program interface (API) to perform various operations (e.g., creating an audience, transmitting or receiving data, and retrieving the computed audience list.

FIG. 6 is a block diagram illustrating another example of an embodiment providing audience computation as a service. In this example, the components of the application server 610 interface with the components of the audience computation service (including segment serves 620) via one or more audience computation application servers (through an API) and via one or more list membership change servers implementing the "process list membership change event stream" functionality. The system in FIG. 6 may be used for similar use cases across other clouds.

The specific details of the specific aspects of implementations disclosed herein may be combined in any suitable manner without departing from the spirit and scope of the disclosed implementations. However, other implementations may be directed to specific implementations relating to each individual aspect, or specific combinations of these individual aspects. Additionally, while the disclosed examples are often described herein with reference to an implementation in which an on-demand database service environment is implemented in a system having an application server providing a front end for an on-demand database service capable of supporting multiple tenants, the present implementations are not limited to multi-tenant databases or deployment on application servers. Implementations may be practiced using other database architectures, i.e., ORACLE®, DB2® by IBM and the like without departing from the scope of the implementations claimed.

It should also be understood that some of the disclosed implementations can be embodied in the form of various types of hardware, software, firmware, or combinations thereof, including in the form of control logic, and using such hardware or software in a modular or integrated manner. Other ways or methods are possible using hardware and a combination of hardware and software. Additionally, any of the software components or functions described in this application can be implemented as software code to be executed by one or more processors using any suitable computer language such as, for example, Java, C++ or Perl using, for example, existing or object-oriented techniques. The software code can be stored as a computer- or processor-executable instructions or commands on a physical non-transitory computer-readable medium. Examples of suitable media include random access memory (RAM), read only memory (ROM), magnetic media such as a hard-drive or a floppy disk, or an optical medium such as a compact disk (CD) or DVD (digital versatile disk), flash memory, and the like, or any combination of such storage or transmission devices. Computer-readable media encoded with the software/program code may be packaged with a compatible device or provided separately from other devices (for example, via Internet download). Any such computer-readable medium may reside on or within a single computing device or an entire computer system, and may be among other computer-readable media within a system or network. A computer system, or other computing device, may include a monitor, printer, or other suitable display for providing any of the results mentioned herein to a user.

While some implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A segment server computer system comprising:
a processor; and
memory coupled to the processor and storing instructions that, when executed by the processor, cause the segment server computer system to perform operations comprising:
receiving, from an application server:
a first message that includes an indication of a first portion of source list identifiers for a first target audience, and a first key associated with the target audience, wherein the first key is a first message sequence number;
a second message that includes an indication of a second portion of source list identifiers for a second target audience, and a second key associated with the second target audience, wherein the second key is a second message sequence number;
a third message that includes an indication of a first portion of suppression list identifiers for the first target audience, and the first key; and
a fourth message that includes an indication of a second portion of suppression list identifiers for the second target audience, and the second key;
determining that the segment server computer system is to process the first message and the third message;
generating a first target audience list that includes an indication of the first portion of source list identifiers less the first portion of suppression list identifiers; and
transmitting the first target audience list to the application server.

2. The system of claim 1, wherein determining that the segment server computer system is to process the first message and the third message includes determining that the segment server computer system is not to process the second and fourth message.

3. The system of claim 2, wherein determining whether to process each of the received messages is based on the respective key in each respective received message.

4. The system of claim 1, wherein generating the first target audience list includes storing the indications of the identifiers in a hashmap.

5. The system of claim 4, wherein a hashmap put operation is performed to add each source list identifier to the hashmap, and wherein a hashmap remove operation is performed to remove each suppression list identifier from the hashmap.

6. The system of claim 1, wherein the segment server computer system maintains a plurality of hashmaps, and wherein each respective hashmap is associated with a respective key for a respective audience list.

7. The system of claim 1, wherein the segment server computer system removes the hashmap subsequent to transmitting the first target audience list to the application server.

8. A tangible, non-transitory computer-readable medium storing instructions that, when executed by a segment server computer system, cause the segment server computer system to perform operations comprising:
receiving, from an application server:
a first message that includes an indication of a first portion of source list identifiers for a first target audience, and a first key associated with the target audience, wherein the first key is a first message sequence number;
a second message that includes an indication of a second portion of source list identifiers for a second target audience, and a second key associated with the second target audience, wherein the second key is a second message sequence number;
a third message that includes an indication of a first portion of suppression list identifiers for the first target audience, and the first key; and
a fourth message that includes an indication of a second portion of suppression list identifiers for the second target audience, and the second key;
determining that the segment server computer system is to process the first message and the third message;
generating a first target audience list that includes an indication of the first portion of source list identifiers less the first portion of suppression list identifiers; and
transmitting the first target audience list to the application server.

9. The computer-readable medium of claim 8, wherein determining that the segment server computer system is to process the first message and the third message includes determining that the segment server computer system is not to process the second and fourth message.

10. The computer-readable medium of claim 9, wherein determining whether to process each of the received messages is based on the respective key in each respective received message.

11. The computer-readable medium of claim 8, wherein generating the first target audience list includes storing the indications of the identifiers in a hashmap.

12. The computer-readable medium of claim 11, wherein a hashmap put operation is performed to add each source list identifier to the hashmap, and wherein a hashmap remove operation is performed to remove each suppression list identifier from the hashmap.

13. The computer-readable medium of claim 8, wherein the segment server computer system maintains a plurality of hashmaps, and wherein each respective hashmap is associated with a respective key for a respective audience list.

14. An application server computer system comprising:
a processor; and
memory coupled to the processor and storing instructions that, when executed by the processor, cause the application server computer system to perform operations comprising:
retrieving, from the memory, a source list of identifiers;
generating a first message that includes an indication of a first portion of the source list identifiers for a first target audience, and a first key associated with the target audience, wherein the first key is a first message sequence number;
generating a second message that includes an indication of a second portion of the source list identifiers for a second target audience, and a second key associated with the second target audience, wherein the second key is a second message sequence number;
retrieving, from the memory, a suppression list of identifiers;
generating a third message that includes an indication of a first portion of the suppression list identifiers for the first target audience, and the first key;
generating a fourth message that includes an indication of a second portion of the suppression list identifiers for the second target audience, and the second key;
transmitting the first, second, third, and fourth messages to each of a plurality of segment servers;
receiving, from a first segment server of the plurality of segment servers, a first target audience list that includes an indication of the first portion of source list identifiers less the first portion of suppression list identifiers; and
receiving, from a second segment server of the plurality of segment servers, a second target audience list that includes an indication of the second portion of source list identifiers less the second portion of suppression list identifiers.

15. The system of claim 14, wherein the first, second, third, and fourth messages are transmitted via a stream processing platform.

16. The system of claim 14, wherein the first and second target audience lists are received via a stream processing platform.

17. The system of claim 14, wherein the source list of identifiers for the target audience lists includes a respective entry for each respective audience member, and wherein each respective entry includes a plurality of fields.

18. The system of claim 17, wherein the plurality of fields for each respective entry in the source list includes an indicator that the respective audience member is to be included in the respective audience, and: an organization identifier, a user identifier, or an audience name.

19. The system of claim 14, wherein the suppression list of identifiers for the target audience lists includes a respective entry for each respective audience member, and wherein each respective entry includes a plurality of fields.

20. The system of claim 19, wherein the plurality of fields for each respective entry in the suppression list includes an indicator that the respective audience member is to be excluded from the respective audience, and: an organization identifier, a user identifier, or an audience name.

* * * * *